(12) United States Patent
Lee et al.

(10) Patent No.: US 6,577,606 B1
(45) Date of Patent: Jun. 10, 2003

(54) ECHO CANCELLATION APPARATUS IN A DIGITAL MOBILE COMMUNICATION SYSTEM AND METHOD THEREOF

(75) Inventors: Won Myoung Lee, Daejon-Shi (KR); Song In Choi, Daejon-Shi (KR); Ki Chul Han, Daejon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 0 days.

(21) Appl. No.: 09/144,452

(22) Filed: Sep. 1, 1998

(30) Foreign Application Priority Data

Nov. 25, 1997 (KR) .............................. 97-62901

(51) Int. Cl.[7] ................................ H04B 3/23
(52) U.S. Cl. ................... 370/290; 379/406.08
(58) Field of Search ............... 370/286, 288, 370/289, 290, 291; 379/406.01, 406.8, 406.9; 704/264, 267, 207, 211, 219, 223

(56) References Cited

U.S. PATENT DOCUMENTS

| | | | | |
|---|---|---|---|---|
| 4,527,020 A | * | 7/1985 | Ito ........................ 179/170.2 |
| 5,263,020 A | * | 11/1993 | Yatsuzuka et al. ......... 370/32.1 |
| 5,857,167 A | * | 1/1999 | Gritton et al. .............. 704/223 |
| 5,920,834 A | * | 7/1999 | Sih et al. .................... 704/223 |
| 6,185,300 B1 | * | 2/2001 | Romesburg ................. 379/410 |

* cited by examiner

Primary Examiner—Steven Nguyen
Assistant Examiner—Duc Duong
(74) Attorney, Agent, or Firm—Antonelli, Terry, Stout & Kraus, LLP

(57) ABSTRACT

There is disclosed an echo cancelling apparatus in a digital mobile communication system and method thereof, which is incorporated in a single chip together with a speech coder, and can improve convergence rate by using an excited signal as an input to n adaptive filter and also obtain a stabilized convergence characteristic while using a NLMS algorithm. The echo canceller according to the present invention uses the excited signal obtained at the speech coder as an input signal to an adaptive filter thereby to lower the Eigenvalues distribution rate of the speech signal, thus providing an improved performance compared to the conventional echo canceller.

9 Claims, 2 Drawing Sheets

ECHO CANCELLATION APPARATUS IN A DIGITAL MOBILE COMMUNICATION SYSTEM AND METHOD THEREOF

BACKGROUND OF THE INVENTION

1. Field of the Invention

The present invention relates to an echo cancellation apparatus in a digital mobile communication system and method thereof, and more particularly to an echo cancellation apparatus incorporated in a single chip together with a speech coder, which can improve convergence speed by using an excited signal as an input to an adaptive filter and also obtain a stabilized convergence characteristic while using an NLMS algorithm and method thereof.

2. Description of the Prior Art

Typically, an echo canceler has its object to effectively cancel echo generated by impedance mismatching which exists upon conversion of 4 terminals/2 terminals at a hybrid mating circuit located in the public switching telephone network (PSTN).

The echo canceler in the existing code division multiple access (CDMA) digital mobile communication system uses another DSP chip to perform an echo cancellation function or uses a single DSP chip in which a speech coder and an echo cancellation function is incorporated to perform a speech coding function and an echo cancellation, depending on the type of the digital signal processor (DSP) chip used in the speech coder. The echo canceler used in this mobile communication system uses an adaptive filter, in which an adaptive algorithm has been found in lots of application fields since 1960's. Though many algorithms such as LMS, RLS, LSL, IIR filter structure etc. have published until now, NLMS (Normalized LMS) algorithm which has a minimum amount of computational complexity has been widely implemented in the field of echo cancellation.

Study made of the adaptive filter algorithm until now has been centered at the analysis study on the algorithm itself, and the technical development of the echo canceler mostly includes the contents for its implementation. The initial echo canceler is centered at a PCM speech communication, and the technology concerning the solution of problem in which a low transfer rate speech coder is combined to occur in a mobile communication system environment is rare. Nationally, although the technical development in a speech echo cancellation and a dual communication detection algorithm has proceeded, the technical development combined with the mobile communication environment has not been made.

Also, in a typical mobile communication system, though the NLMS (Normalized Least Means Square) algorithm has been widely used due to its easy implementation, the NLMS algorithm has a problem that it could not rapidly converge a great change in an initial state or an echo path because its convergence rate becomes slower if the correlating degree between the signals such as a speech signal in characteristic is high. RLS (Recursive Least Square) or LSL (Least Square Lattice) algorithms etc. have disadvantages that they have a rapid convergence rate but require a great amount of computation, thus making a realtime implementation difficult.

SUMMARY OF THE INVENTION

It is an object to provide an echo cancellation apparatus in which an echo canceller is combined with a speech coder at a single DSP chip in a mobile communication system, which can rapidly converge a great change in an initial state or an echo path because its convergence rate becomes slower with respect an input in which the correlation degree between a speech signal is high; which has an improved performance in cancelling an echo by lowering Eigenvalues of a speech signal; which has a simplified structure using an echo cancellation algorithm with an improved performance using a given amount of computation and a given memory; and which can provide an economic advantage by improving the performance through an algorithm without implementing additional hardware.

To achieve the above object, the echo cancellation method in a mobile communication system according to the present invention comprises the steps of storing codebook indexes and gains in a memory every frame using a normalized least means square (NLMS) in a mobile communication system; generating the stored codebook indexes and gains as an excited signal depending on a counter signal of a speech coding means; and adaptively filtering to cancel echo using the excited signal as an input signal of an adaptive filter.

To achieve the above object, the echo cancellation apparatus implemented with a speech coding means using a signal processing chip in a base station controller in a mobile communication system according to the present invention comprises adaptive filtering means for generating an excited signal using codebook indexes and gains as inputs depending on a counting timing from a speech coding means, and means for cancelling echo using the excited signal.

BRIEF DESCRIPTION OF THE DRAWINGS

The above object, and other features and advantages of the present invention will become more apparent by describing the preferred embodiment thereof with reference to the accompanying drawings, in which.

DETAILED DESCRIPTION OF PREFERRED EMBODIMENT

The present invention will be explained in detail below by reference to the accompanying drawings.

Figure 1:
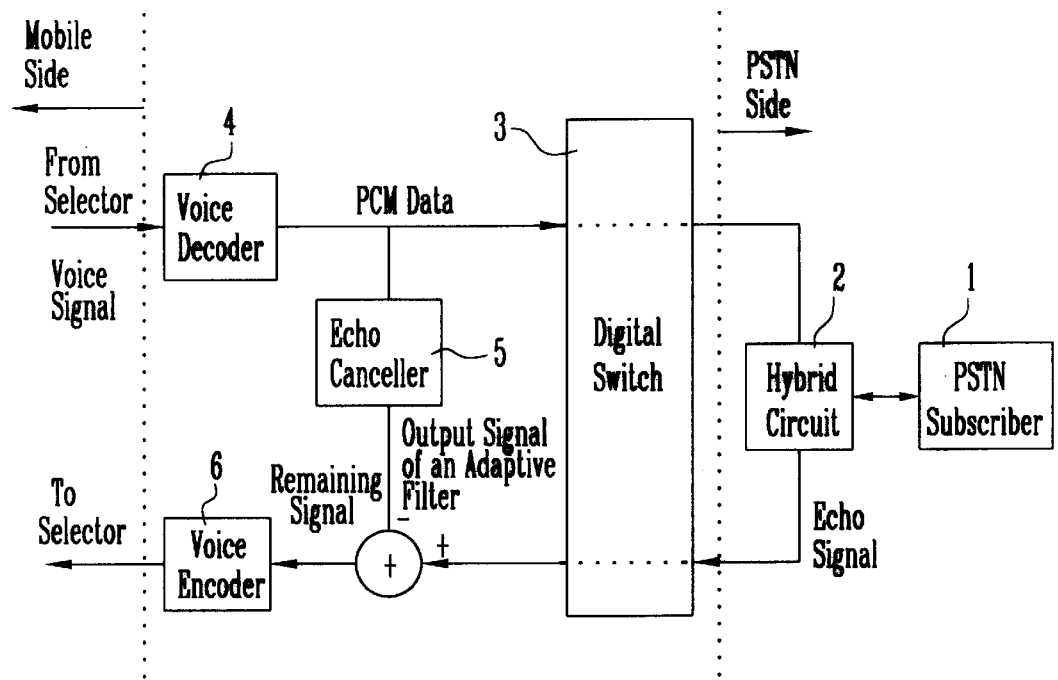
FIG. 1 shows a structure of a digital mobile communication system according to the present invention.

Referring now to FIG. 1, there is shown a structure of a digital mobile communication system according to the present invention, which includes a hybrid circuit 2, a digital switch 3, an echo canceller 5, a speech decoder 4 and a speech encoder 6. As there is no the hybrid circuit 2 in the digital mobile communication subscriber matching section, when the speech signal of one subscriber 1 connected to the PSTN is transmitted to a the other subscriber on the mobile communication network, the subscriber 1 on the PSTN is not affected by echo. However, when the speech signal from the mobile communication switch telephone network is transmitted to the subscriber 1 on the PSTN, an echo signal is generated from the hybrid circuit 2 in the matching section, which is then returned to the subscriber on the mobile communication switch network. Therefore, in the mobile communication switch network, echo of the speech signal is cancelled only if it has a mobile-to-land path.

Figure 2:
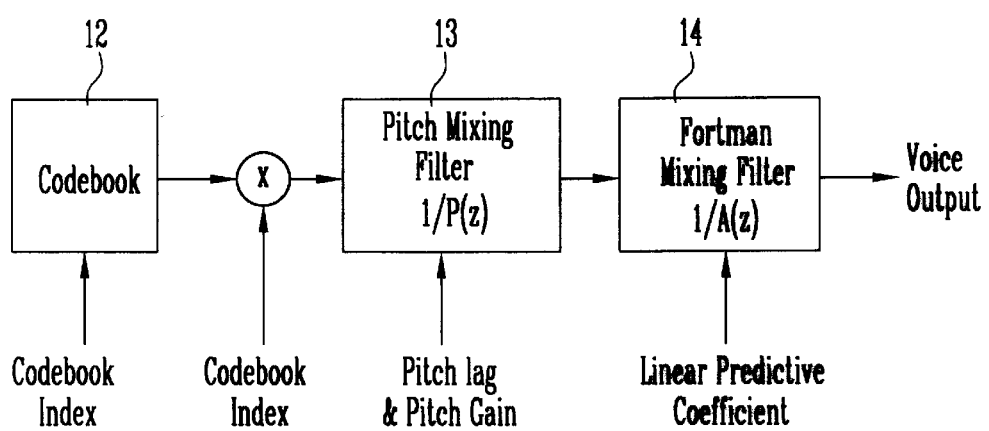
FIG. 2 shows a coding structure of a digital speech coder in a digital mobile communication system according to the present invention.

Referring now to FIG. 2, there is shown a coding structure of a digital speech coder according to the present invention, which includes a codebook 12, a pitch mixing filter 13 and a fortman synthesis filter 14 etc.

The speech coder 10 located at the mobile communication base station uses various parameters to generate an original speech through decoding process. At this time, a new codebook index and a gain which are received every frame are stored at a given memory, so that they can later be reproduced and used as an input signal to an adaptive filter. During this process, an adaptive filter removes an echo generated by the hybrid circuit 2. The time to update the codebook index and the gain which are arrived every frame is clocked by a timer provided at the speech coder 10. That is, the codebook index and the gain which are used during one frame have to be updated every sub-frame. Then, the start time of a new frame and a sub-frame is recognized through timing information obtained at the speech coder 10 and then stored at a given memory so as to update a new codebook index and a gain.

Figure 3:
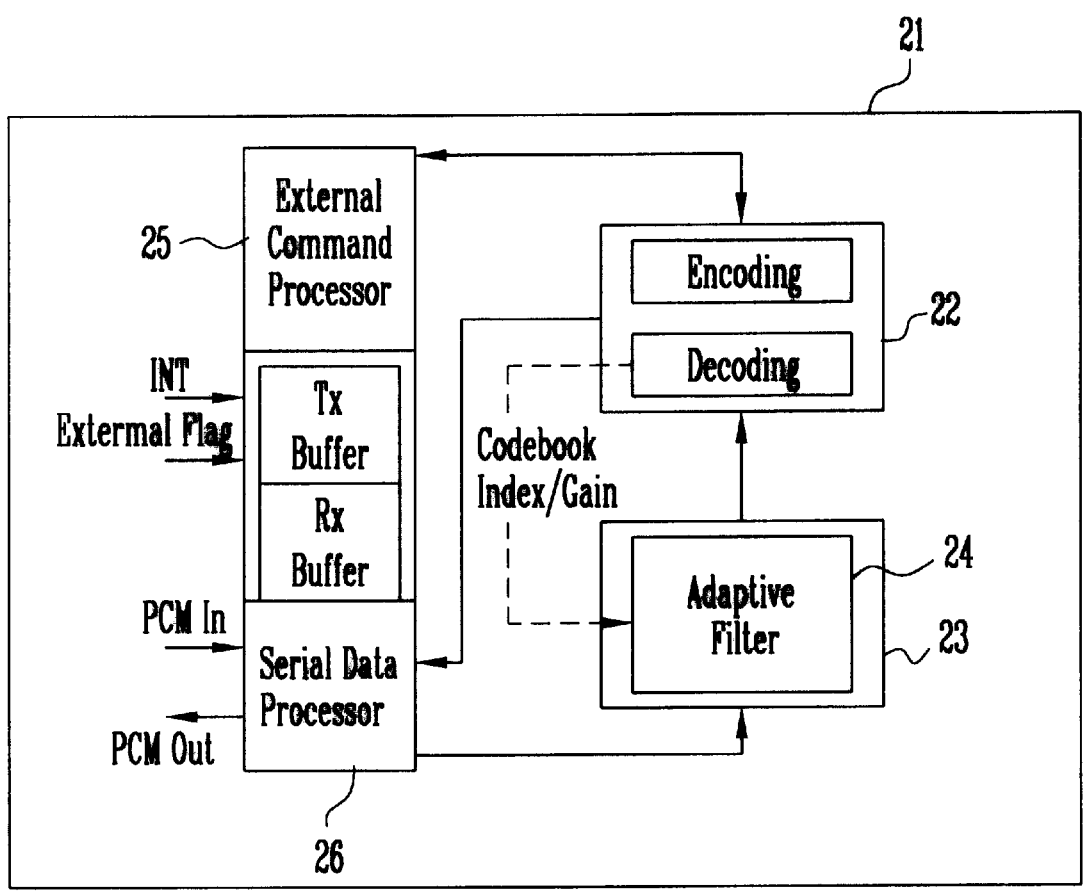
FIG. 3 shows a structure of an echo canceller using an excited signal obtained from the speech coder in a digital mobile communication system according to the present invention.

Referring to FIG. 3, there is shown a structure of an echo canceller using a linear predictive coefficient at the speech coder according to the present invention, which includes a speech coder 22, an echo canceller 23, and adaptive filter 24, an external command processor 25 and a serial data processor 26 in the digital signal processor 21. In case that an input signal has high Eigenvalues distribution rate such as a speech signal, the convergence performance of the NLMS algorithm will become lower.

Therefore, in order to improve the convergence rate of the adaptive filter 24, the input signal must be converted into a signal having a low Eigenvalues distribution value. An excited signal generated in the process of speech coding has a characteristic of low Eigenvalues distribution rate. As a result, the convergence rate can be improved by using the excited signal as an input signal to the adaptive filter 24.

The present invention employs a NLMS algorithm used in the existing echo canceller, and the adaptive filter of the echo canceller performs a modified adaptive algorithm using speech parameters obtained at the speech coder 22. Therefore, when an excited signal having an excitation component among the speech signal is used as an input to the adaptive filter 24, the convergence rate can be improved because the Eigenvalues distribution rate of the self-correlation matrix of the input signal is decreased. The excited signal is obtained by multiplying the codebook index and the gain which are obtained in the encoding process of the speech coder 22, and the codebook and gain are updated every speech sub-frame.

The excited signal can be generated based on the following [equation 1].

$$y(n) = gC_i(n) \quad \text{[Equation 1]}$$
$$C_i(n) = \begin{bmatrix} C((n-i) \bmod 128) & n-1 \geq 0 \\ C(128+(N-I)) & n-1 < 0 \end{bmatrix}$$

In equation 1, y(n) indicates a speech signal and an excited signal, C indicates a codebook value, and g indicates a codebook gain.

Assuming that the system to be recognized is unchanged when it is linear. At this time, the relationship between input and output can be expressed into the following equation 2, wherein the system to be recognized becomes a hybrid matching circuit.

$$r(n) = \sum_{l=1}^{TAP} h'(1) * y(n-l) \quad \text{[Equation 2]}$$

In equation 2, r(n) indicates an echo signal and h' indicates an impulse response of the echo path.

The echo signal generated at the hybrid circuit is cancelled by the echo canceller 23, and the remaining signal from which the echo signal is cancelled can be expressed into the following equation 3.

[Equation 3]

$$e(n)r(n)-r'(n)$$

In equation 3, e(n) indicates a remaining signal and r'(n) indicates an output signal of the adaptive filter 24.

Codebook index and gain necessary to generate an excited signal are substituted with a new value every frame. Since they have different values every sub-frame, new codebook index and gain are used to generate an excited signal every sub-frame.

In order to efficiently perform echo cancellation, it is important to recognize the length of the echo path generated at the hybrid circuit. However, it is often impossible to predict the length of the echo path exactly. Accordingly, as it is slowly time-varying, a method is employed by which a given number of linear predictive coefficients are stored at the memory so as to cancel echo.

As described above, the echo canceller according to the present invention can have an improved performance compared to the conventional echo canceller because it can improve the convergence rate of the adaptive filter through modified LNMS algorithm using a speech information provided from the speech coder. This improvement in performance can also improve an echo problem which is often generated because a rapid change on the transmission path could not be appropriately predicted during operation of the CDMA mobile communication system. Also, the echo canceller according to the present invention can be easily applied to a speech coder chip of the mobile communication base station, only by changing DSP program. Thus, this type of the echo cancelling algorithm combined with the speech coder can be also used in cancelling acoustic echo which degrades the quality of communication when used in a hands-free function in a terminal. Additionally, the echo cancellation algorithm proposed by the present invention can be applied to IMT-2000(International Mobile Telecommunication-2000) which is a next generation land/marine mobile communication system including a personal communication system (PCS) and a satellite communication. While the present invention has been described and illustrated herein with reference to the preferred embodiment thereof, it will be understood by those skilled in the art that various changes in form and details may be made therein without departing from the spirit and scope of the invention.

What is claimed is:

1. An echo cancellation method in a mobile communication system, comprising the steps of:
storing codebook indexes and gains in a memory at every frame using a normalized least means square (NLMS) algorithm in a mobile communication system;
updating the codebook indexes and gains at every frame depending on a counter signal from a speech coder, and generating an excited signal by multiplying each codebook index and gain; and adaptively filtering to cancel echo using said excited signal as an input signal of an adaptive filter.

2. An echo cancellation apparatus implemented with a speech coder using a digital signal processor (DSP) chip in a base station in a mobile communication system, comprising:

adaptive filtering means for generating an excited signal using codebook indexes and gains as inputs depending on a counter signal from the speech coder, wherein the codebook indexes and gains are received, stored and updated at every frame of a speech signal using a normalized least means square (NLMS) algorithm, the excited signal is obtained by multiplying each codebook index and gain at every frame; and means from canceling echo using said excited signal.

3. The echo cancellation apparatus as claimed in claim 2, wherein the excited signal is obtained based on the following equation:

$$y(n) = gC_i(n)$$
$$C_i(n) = \begin{bmatrix} C((n-i) \bmod 128) & n-1 \geq 0 \\ C(128+(N-I)) & n-1 < 0 \end{bmatrix}$$

where y(n) indicates a speech signal, C indicates a codebook value, and g indicates a codebook gain.

4. The echo cancellation method as claimed in claim 1, wherein the excited signal is generated based on the following equation:

$$y(n) = gC_i(n)$$
$$C_i(n) = \begin{bmatrix} C((n-i) \bmod 128) & n-1 \geq 0 \\ C(128+(N-I)) & n-1 < 0 \end{bmatrix}$$

where y(n) indicates a speech signal, C indicates a codebook value, and g indicates a codebook gain.

5. A digital signal processor (DSP) for use in a mobile communication system, comprising:

a speech coder arranged to receive a speech signal, store and update a codebook index and gain at every frame using a normalized least means square (NLMS) algorithm, and to generate an excited signal by multiplying each codebook index and gain at every frame; and an echo canceler arranged to perform echo cancellation from the speech signal using the excited signal, said echo canceler comprising an adaptive filter arranged to receive the excited signal and adaptively filter the speech signal to cancel an echo using the excited signal.

6. The digital signal processor (DSP) as claimed in claim 5, wherein the excited signal is generated based on the following equation:

$$y(n) = gC_i(n)$$
$$C_i(n) = \begin{bmatrix} C((n-i) \bmod 128) & n-1 \geq 0 \\ C(128+(N-I)) & n-1 < 0 \end{bmatrix}$$

where y(n) indicates a speech signal, C indicates a codebook value, and g indicates a codebook gain.

7. The digital signal processor (DSP) as claimed in claim 5, wherein the excited signal obtained by multiplying each codebook index and gain at every signal frame of the speech signal exhibits a low Eigenvalues distribution rate.

8. The digital signal processor (DSP) as claimed in claim 5, further comprising buffers arranged to temporarily store the speech signal before and after echo cancellation.

9. The digital signal processor (DSP) as claimed in claim 5, further comprising buffers arranged to temporarily store the speech signal before and after echo cancellation.

* * * * *